(12) United States Patent
Ferguson

(10) Patent No.: US 8,085,933 B2
(45) Date of Patent: *Dec. 27, 2011

(54) CIPHER FOR DISK ENCRYPTION

(75) Inventor: Niels Thomas Ferguson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/553,193

(22) Filed: Sep. 3, 2009

(65) Prior Publication Data

US 2010/0002873 A1  Jan. 7, 2010

Related U.S. Application Data

(63) Continuation of application No. 11/211,865, filed on Aug. 25, 2005, now Pat. No. 7,602,906.

(51) Int. Cl.
*H04L 9/00* (2006.01)
(52) U.S. Cl. .......................... 380/29; 380/42
(58) Field of Classification Search .............. 380/28, 380/29, 37, 42; 705/50
See application file for complete search history.

(56) References Cited

U.S. PATENT DOCUMENTS

| | | | |
|---|---|---|---|
| 6,182,216 B1 * | 1/2001 | Luyster | 713/168 |
| 6,246,768 B1 * | 6/2001 | Kim | 380/28 |
| 6,259,789 B1 | 7/2001 | Paone | |
| 6,578,150 B2 * | 6/2003 | Luyster | 380/37 |
| 6,751,319 B2 * | 6/2004 | Luyster | 380/37 |
| 7,177,424 B1 * | 2/2007 | Furuya et al. | 380/37 |
| 7,305,085 B2 * | 12/2007 | Ohkuma et al. | 380/42 |
| 7,499,542 B2 * | 3/2009 | Vaudenay et al. | 380/28 |
| 7,512,241 B2 * | 3/2009 | Vaudenay et al. | 380/277 |
| 7,587,614 B1 * | 9/2009 | Langhammer | 713/189 |
| 2002/0016773 A1 * | 2/2002 | Ohkuma et al. | 705/50 |
| 2004/0131182 A1 * | 7/2004 | Rogaway | 380/37 |
| 2004/0247117 A1 * | 12/2004 | Vaudenay et al. | 380/37 |
| 2005/0180565 A1 | 8/2005 | Kurdziel et al. | |

OTHER PUBLICATIONS

Anderson, Ross, et al., "Two Practical and Provably Secure Block Ciphers: BEAR and LION," *Proceedings of the Third International Workshop on Fast Software Encryption, Lecture Notes in Computer Science*, 1996, (1039)113-120.

Bellaire, Mihir, et al., "On the Construction of Variable-Input-Length Ciphers," *Lecture Notes in Computer Science, Proceedings of the 6th International Workshop on Fast Software Encryption*, 1999, (1636), 231-244.

Crowley, Paul, "Mercy: A Fast Large Block Cipher for Disk Sector Encryption," *Lecture Notes in Computer Science, Proceedings of the 7th International Workshop on Fast Software Encryption*, 2000, (1978),49-63.

Ferguson, Niels, et al., "Helix, Fast Encryption and Authentication in a Single Cryptographic Primitive," *Lecture Notes in Computer Science, Fast Software Encryption: 10th International Workshop, Revised Papers, FSE 2003*, Feb. 24-26, 2003, 1-18.

(Continued)

*Primary Examiner* — Samson Lemma
(74) *Attorney, Agent, or Firm* — Woodcock Washburn LLP

(57) ABSTRACT

Encryption is provided with additional diffusion components to construct a block cipher with a large and variable block size. The cipher incorporates an encryption system or algorithm such that the cipher is at least as secure as the encryption system or algorithm. Additional components of the cipher provide improved diffusion. This combination ensures that the cipher is at least as strong as the encryption algorithm, and at the same time it provides additional security properties due to its improved diffusion.

20 Claims, 4 Drawing Sheets

OTHER PUBLICATIONS

Fluhrer, Scott R., "Cryptanalysis of the Mercy Block Cipher," *Lecture Notes in Computer Science, Revised Papers from the 8th International Workshop on Fast Software Encryption*, 2001, 2355, 28-36.

Liskov, Moses, et al., "Tweakable Block Ciphers," *Lecture Notes in Computer Science, Proceedings of the 22nd Annual International Cryptology Conference on Advances in Cryptology*, 2002, 2442, 31-46.

Lucks, Stefan, et al., "BEAST: A Fast Block Cipher for Arbitrary Blocksizes," *Proceedings of the IFIP TC6/TC11 International Conference on Communications and Multimedia Security II*, 1997, 144-153.

Morin, Pat, "A Critique of BEAR and LION," http://citeseer.ist.psu.edu/124166.html; Undated,1-6.

* cited by examiner

US 8,085,933 B2

CIPHER FOR DISK ENCRYPTION

CROSS-REFERENCE TO RELATED APPLICATIONS

This application is a continuation of U.S. patent application Ser. No. 11/211,865, filed Aug. 25, 2005, the disclosure of which is incorporated herein in its entirety.

BACKGROUND

Technologies are being developed to provide additional security for computer users. Encrypting the sectors on a disk is best done with a block cipher that has a large block size and good diffusion properties. There are currently no industry-standard block ciphers with a sufficiently large block size.

A suitable cipher has two security properties. The encryption property ensures that an attacker cannot recover the plaintext given the ciphertext. The diffusion property ensures that if an attacker makes any modification to the ciphertext of a sector, then the changes in the plaintext of the sector are essentially random over the whole sector. This severely hinders an attacker that tries to attack a computer by modifying the ciphertext stored on the disk.

A suitable cipher should also be fast enough. A slow cipher will result in a significant loss of performance of the disk, thereby reducing the usability of the computer.

Existing ciphers are unsuitable for various reasons. For example, stream ciphers have no diffusion at all, and allow an attacker to flip arbitrary bits in the plaintext. Advanced Encryption Standard (AES) is a well-known block cipher. Cipher block chaining (CBC) is a mode of operation of AES. AES-CBC is typically a leading candidate when data is to be encrypted. For the technologies being developed, AES-CBC is not suitable, due to the lack of diffusion in the CBC decryption operation. If the attacker introduces a change Δ in ciphertext block i, then plaintext block i is randomized, but plaintext block i+1 is changed by Δ. In other words, the attacker can flip arbitrary bits in one block at the cost of randomizing the previous block. This property can be used to attack executables. The instructions can be changed at the start of a function at the cost of damaging whatever data is stored just before the function. With thousands of functions in the code, it is likely that a suitable attack location can be found.

Bear and Lion are two conventional large-block block ciphers. Bear and Lion are very similar in construction. They split the data block into two unequal parts and create a 3-round Luby-Rackoff cipher by using a keyed hash function and a stream cipher to construct the round functions. Bear uses two keyed hash function rounds and one stream cipher round, whereas Lion uses one keyed hash function round and two stream cipher rounds. However, Bear and Lion are too slow. Both ciphers make three passes over the data.

Another cipher is Beast, which is a variation of Bear. It is faster than Bear because it replaces the last round of Bear by a function that does not process the entire data block. However, this change destroys the diffusion properties of the decryption function, making it unsuitable for the newly developed technologies. Though faster than Bear, it still requires two passes over the data—one with a hash function and one with a stream cipher. This is too slow.

SUMMARY

Encryption is provided with additional diffusion components to construct a block cipher with a large and variable block size. The cipher incorporates an encryption system or algorithm such that the cipher is at least as secure as the encryption system or algorithm. Additional components of the cipher provide improved diffusion. This combination ensures that the cipher is at least as strong as the encryption algorithm, and at the same time it provides additional security properties due to its improved diffusion.

DETAILED DESCRIPTION

A cipher incorporates an established cipher (e.g., AES), as well as additional components that act as a diffuser. The established cipher component provides a minimum level of security with high assurance. The additional components are provided as an independent layer on top of the established cipher and provide additional security features. The independent layer acts as a diffuser so that an attacker cannot control changes to the plaintext. In other words, if changes are made to the ciphertext, the changes to the plaintext cannot be controlled or predicted. This thwarts a manipulation attack.

The cipher design ensures that, even if the additional components are malicious, they cannot reduce the security of the established cipher component. This design provides the assurance associated with using the established cipher, plus the additional security features. The examples described herein use AES as the established cipher, though it is contemplated that the invention may be used with other ciphers.

An example cipher desirably (1) encrypts and decrypts disk sectors of size 512, 1024, 2048, 4096, or 8192 bytes, though any size may be used, (2) takes the sector number as an extra parameter (the tweak) and implements different encryption/decryption algorithms for each sector, (3) protects confidentiality of the plaintext, and (4) provides protection such that an attacker cannot control or predict any aspect of the plaintext changes if he modifies or replaces the ciphertext of a sector.

Figure 1:
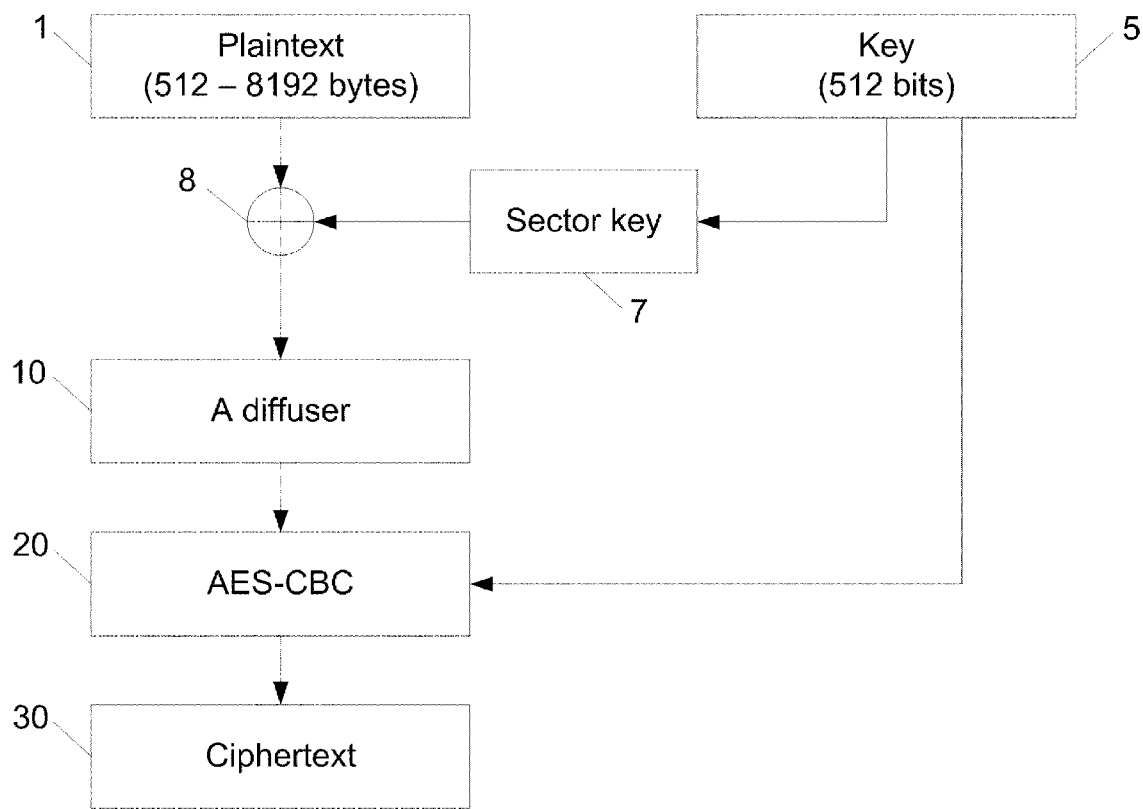
FIG. 1 is a block diagram of an example cipher.
Figure 2:
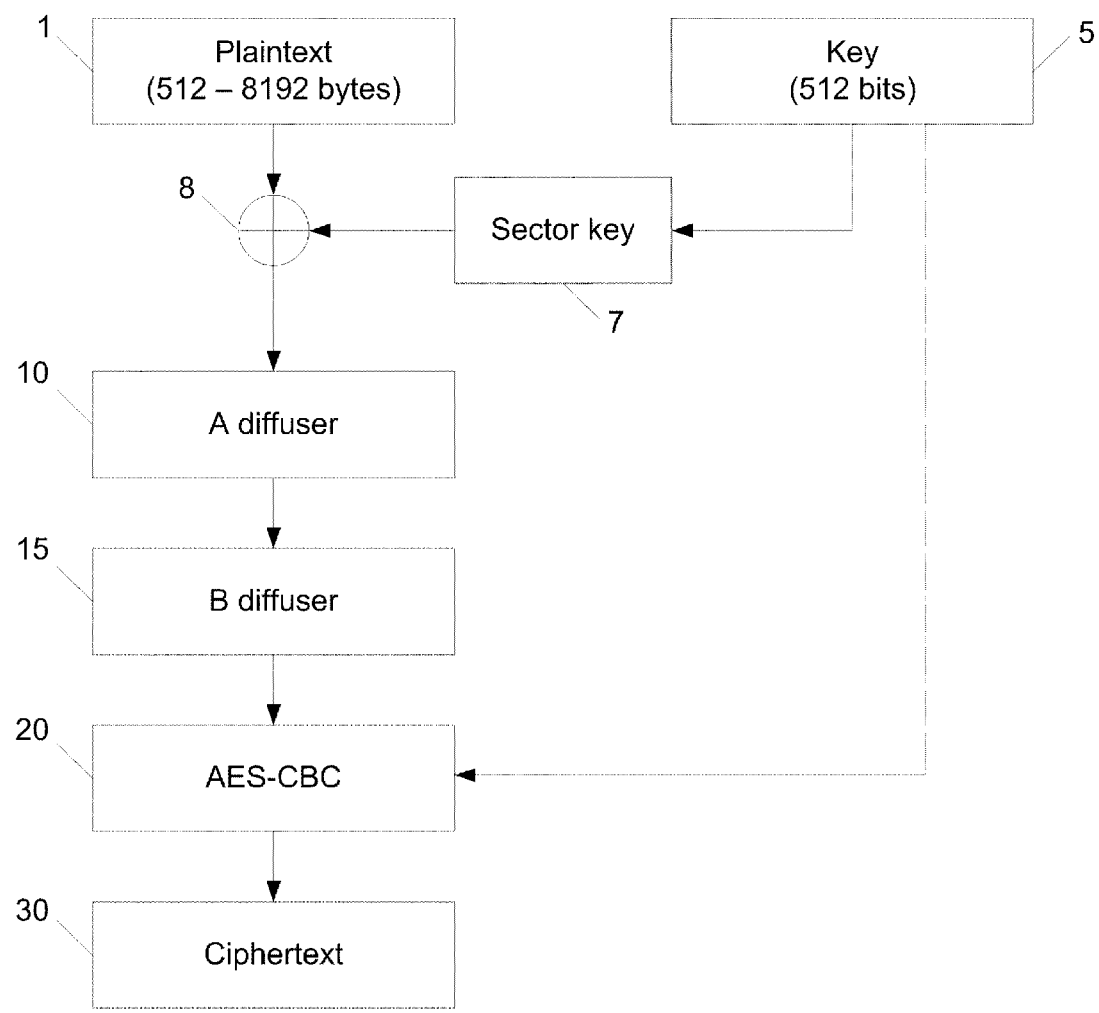
FIG. 2 is a block diagram of another example cipher.
Figure 3:
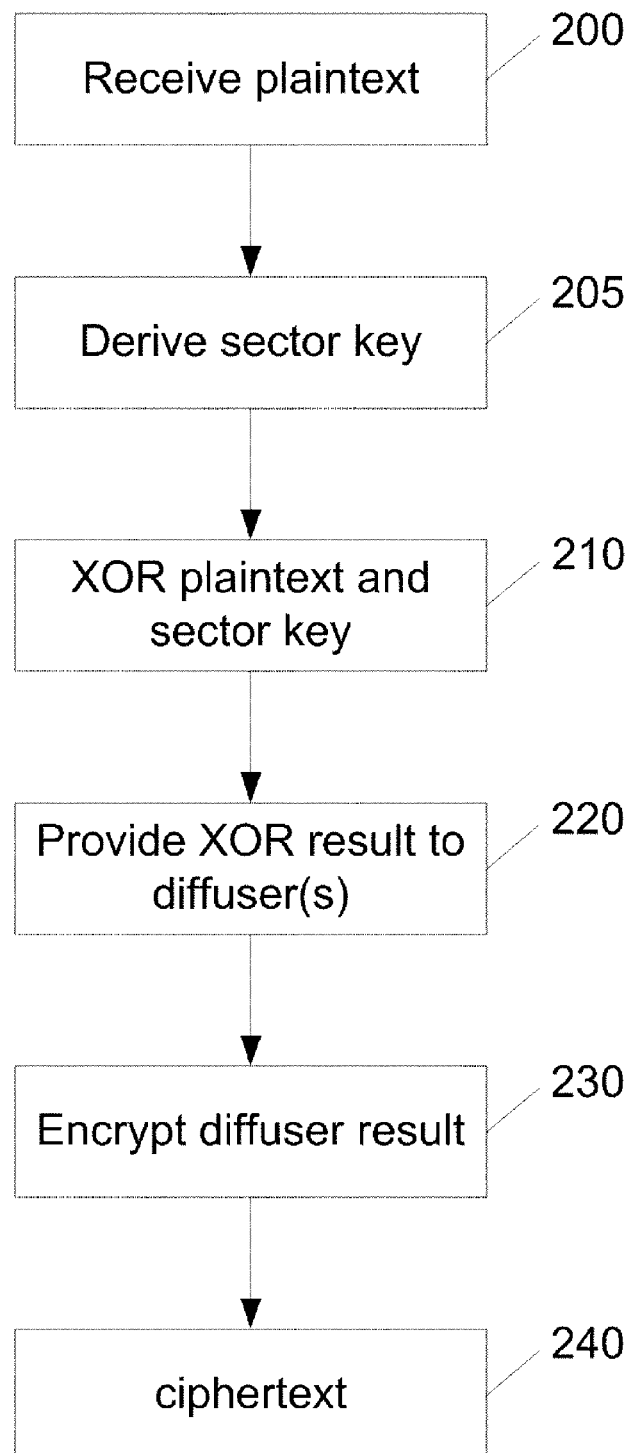
FIG. 3 is a flow diagram of an example cipher method.

FIG. 1 is a block diagram of an example cipher. FIG. 2 is a block diagram of another example cipher. FIG. 1 comprises one diffuser 10, whereas FIG. 2 comprises two diffusers 10, 15. The cipher of FIG. 1 may be used, though the cipher of FIG. 2 may be more desirable because of its two diffusers. FIG. 3 is a flow diagram of an example cipher method.

There are several separate operations in each encryption. The plaintext 1 is received (step 200) and is xorred (exclusive-or) with a sector key 7 (step 210) that has been derived from a key 5 (step 205). The result of the xor operation 8 is then run through the (unkeyed) diffuser(s) 10 and/or 15 (step 220), and the result is encrypted with AES in CBC mode 20 (step 230). This provides ciphertext 30 (step 240).

The sector key component 7 and the AES-CBC component 20 are independently keyed which allows for the cipher to be at least as secure as AES-CBC. Both components 7, 20 may be provided with 256 bits of key material, so that the full cipher key is 512 bits. In some versions for example, the AES-CBC component 20 may only use 128 bits of key, so some of the key bits go unused, but other versions can upgrade to using larger keys without any changes to the key management system. Similarly, the sector key (component 7) may use all or some of the key bits provided to that component. Thus, for example, half of the key 5 (e.g., 256 bits) goes to the sector key 7 and the other half of the key 5 goes to the AES-CBC component 20.

It is contemplated that the block size (i.e., the size of the plaintext of each cipher invocation) of the cipher is variable. For example, a block size may be any power of two within the range 512-8192 bytes (4096-65536 bits). However, any block size may be used, such as 16 bytes.

With respect to an example AES-CBC component 20, the first 128 bits of the 256 bits of available key material may make up the AES key $K_{AES}$. The block size is desirably a multiple of 16 bytes, so no padding is necessary. The initialization vector (IV) for sector s may be determined by:

$$IV_s := E(K_{AES}, e(s))$$

where E( ) is the AES encryption function, and e( ) is an encoding function that maps each sector number s into a unique 16-byte value. Note that $IV_s$ depends on the key and the sector number, but not on the data.

The result of the diffuser (step 220) is encrypted using AES-CBC and the IV for the sector. Decryption is the inverse function.

The choice of e( ) desirably has no security implications (as long as it is an injection) and will vary with the application.

The sector key 7 may be used so that an attacker does not know what values are being worked on by the diffuser. The sector key 7 may be defined by:

$$K_s := E(K_{sec}, e(s)) \| E(K_{sec}, e'(s))$$

where E( ) is the AES encryption function, $K_{sec}$ is the key for this component, e( ) is the encoding function used in the AES-CBC layer, and e'( ) is a second encoding function with the same property as e( ). Additionally, e( ) and e'( ) should desirably have the property that $e(x) \neq e'(y)$ for every valid sector number x and every valid sector number y.

The sector key $K_s$ is repeated as many times as desired to get a key the size of the block, and the result is xorred into the plaintext.

The sector number is used as a tweak value, which ensures that every sector on the disk is encrypted with a different encryption function. The purpose of the tweak value is to hinder the attacker in manipulating the (encrypted) disk information in a sensible way. The data in sector s is encrypted with the tweak value s. If an attacker moves the ciphertext of sector s to sector s', it will be decrypted with a different tweak value s'. The resulting plaintext will be essentially random. Without a tweak value, an attacker could copy the ciphertext of one sector to another sector, which after decryption has the effect of copying the plaintext of the first sector to the second sector.

The cipher uses the sector number in two different places as tweak value. It is used once to generate the $IV_s$ used in the AES-CBC component, and once to generate $K_s$ which generates the sector key.

The diffusers 10, 15 are very similar, but work in opposite directions. The core diffuser design may have good diffusion properties in one direction and bad diffusion properties in the other direction. Having two diffusers provides good diffusion in both directions.

A function has good diffusion properties if a small change at the input leads to a large change in the output. For an encryption function, a change in a few bits of the input should result in a change of about half of the output bits, for example. It is possible for a function to have good diffusion properties whilst the inverse function does not have good diffusion properties.

The diffusers have been designed in the decryption direction, as decryption is the more common operation for information on a disk. They are described first in the decryption direction, and then the corresponding encryption function is provided.

Each diffuser interprets the sector data as an array of 32-bit words, where each word is encoded using the least-significant-byte first convention. Let n be the number of words in the sector, and $d_i$ be the i'th word of the sector where i is taken modulo n to allow easy wrap-around without confusing notation.

The decryption function of the A diffuser (e.g., diffuser 10 in FIGS. 1 and 2) is given by:

for $i = 0, 1, 2, \ldots, n \cdot A_{cycles} - 1$ $$d_i \leftarrow d_i + (d_{i-2} \oplus (d_{i-5} <<< R^{(a)}_{i \bmod 4}))$$

The value i is a loop counter that goes around the data array $A_{cycles}$ times. It is noted that the indices are modulo n, so the wrap-around is automatic. The addition is modulo $2^{32}$, <<< is the rotate-left operator, and $R^{(a)} := [9, 0, 13, 0]$ is an array of four constants that specify the rotation amounts. These rotation constants are provided as examples, and any values may be used as desired.

The corresponding encryption function of the A diffuser may be derived as:

for $i = n \cdot A_{cycles} - 1, \ldots, 2, 1, 0$ $$d_i \leftarrow d_i - (d_{i-2} \oplus (d_{i-5} <<< R^{(a)}_{i \bmod 4}))$$

Regarding asymmetric diffusion properties, for the A diffuser decryption, the result of one loop iteration is used two and five iterations later which quickly propagates changes to the rest of the sector. In the encryption direction, the output of one iteration is used n-5 and n-2 iterations later, which provides a much slower diffusion.

The B diffuser (e.g., diffuser 15 in FIG. 2) is very similar. It has good diffusion in the encryption direction. The B diffuser decryption function is given by:

for $i = 0, 1, 2, \ldots, n \cdot B_{cycles} - 1$ $$d_i \leftarrow d_i + (d_{i+2} \oplus (d_{i+5} <<< R^{(b)}_{i \bmod 4}))$$

where $R^{(b)} := [0, 10, 0, 25]$. These rotation constants are provided as examples, and any values may be used as desired.

The B diffuser encryption function is given by:

for $i = n \cdot B_{cycles} - 1, \ldots, 2, 1, 0$ $$d_i \leftarrow d_i - (d_{i+2} \oplus (d_{i+5} <<< R^{(b)}_{i \bmod 4}))$$

The constants $A_{cycles}$ and $B_{cycles}$ define how many times each of the diffusers loop around the sector. Example values are $A_{cycles} := 5$ and $B_{cycles} := 3$.

The example rotation amounts described herein were determined based on experiments on the diffusion properties of the diffuser (in the high-diffusion direction). The experiments were concentrated on how quickly a single bit difference diffuses through the 32-bit active word. The results are that if a single bit in $d_i$ is flipped, each of the bits of $d_{i+43}$ has a chance of at least 1/3 of flipping in a single cycle of a diffuser. The 43 words is about a third of a 512-byte sector. This holds for the forward B diffuser. For the backward A diffuser, a bit in $d_i$ flips bits in $d_{i-43}$ with probability 1/3.

The diffuser components of an example cipher are faster than the AES-CBC component. For example, AES-CBC can be implemented on a convention personal computer microprocessor in 20-25 cycles per byte, whereas an example diffuser component, including both diffusers and the key addition, can be implemented in about 10 cycles per byte.

Exemplary Computing Environment

Figure 4:
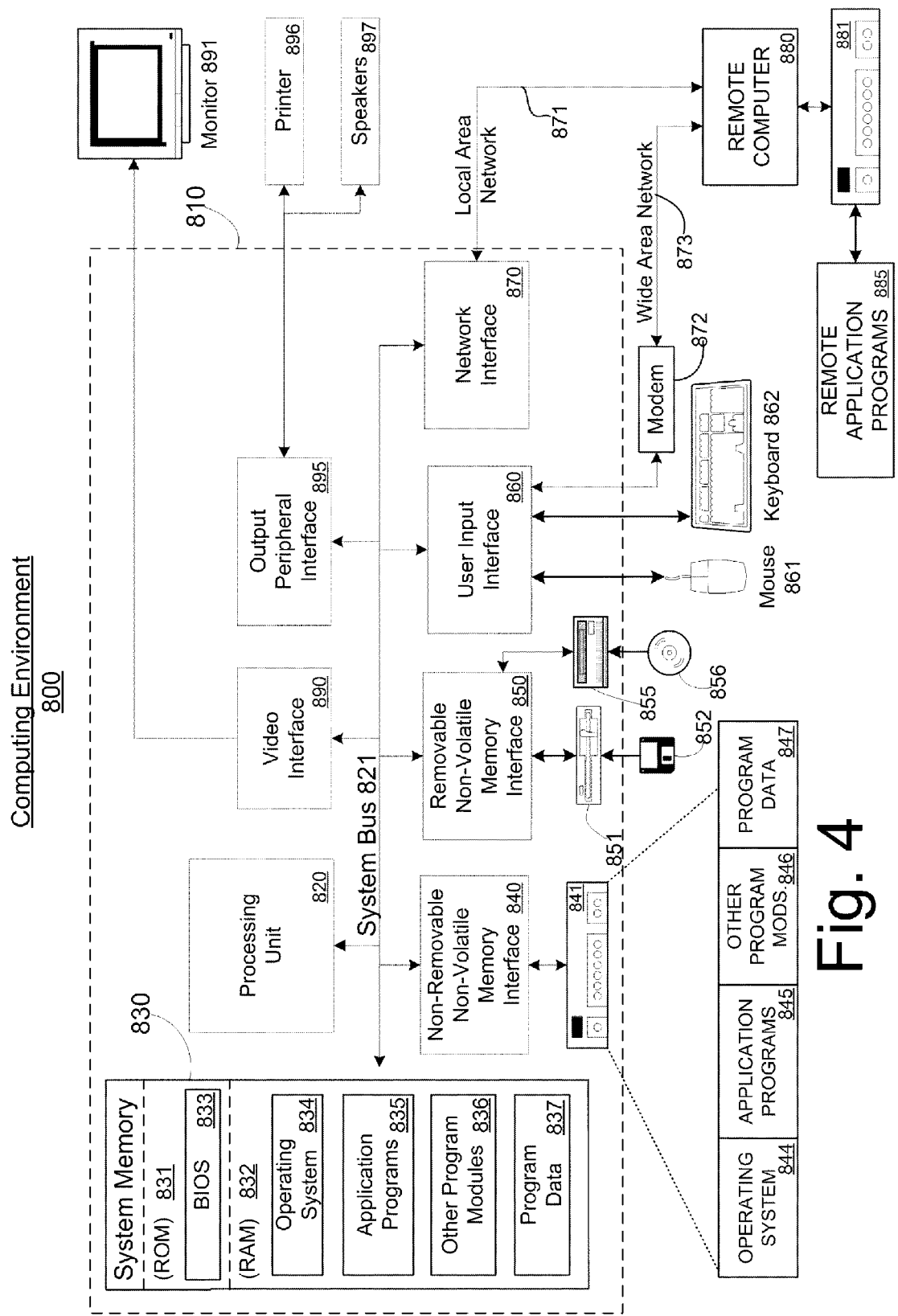
FIG. 4 is a block diagram showing an exemplary computing environment in which aspects of the invention may be implemented.

FIG. 4 illustrates an example of a suitable computing system environment 800 in which the invention may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures.

Computer 810 typically includes a variety of computer readable media. Computer readable media can be any available media that can be accessed by computer 810 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810.

The system memory 830 includes computer storage media in the form of volatile and/or non-volatile memory such as ROM 831 and RAM 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 4 illustrates operating system 834, application programs 835, other program modules 836, and program data 837.

The computer 810 may also include other removable/non-removable, volatile/non-volatile computer storage media. By way of example only, FIG. 4 illustrates a hard disk drive 840 that reads from or writes to non-removable, non-volatile magnetic media, a magnetic disk drive 851 that reads from or writes to a removable, non-volatile magnetic disk 852, and an optical disk drive 855 that reads from or writes to a removable, non-volatile optical disk 856, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media provide storage of computer readable instructions, data structures, program modules and other data for the computer 810. In FIG. 4, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 4. The logical connections depicted include a LAN 871 and a WAN 873, but may also include other networks. Such networking environments are commonplace in offices, enterprise-wide computer networks, intranets and the internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 4 illustrates remote application programs 885 as residing on memory device 881. It will be appreciated that the network connections shown are exemplary and other means of establishing a communications link between the computers may be used.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A cipher system for encrypting plaintext into ciphertext in an encryption direction and for decrypting ciphertext into plaintext in a decryption direction, the cipher system comprising:
   a cipher;
   a processor;
   a first diffuser that, when executed on the processor, provides a first type of diffusion in the encryption direction, wherein, in the first type of diffusion, a change to an input to the first diffuser produces a change to an output from the first diffuser that is larger than the change to the input to the first diffuser; and
   a second diffuser that, when executed on the processor, provides a second type of diffusion in the encryption direction, wherein, in the second type of diffusion, a change to an input to the second diffuser produces a change to an output from the second diffuser that is smaller than the change to the input to the second diffuser,
   wherein the first diffuser is provided with input data that is based on plaintext xorred with a sector key, the sector key is derived from a key that comprises a number of bits, the sector key employs a first portion of the number of bits, and the cipher employs a second portion of the number of bits,
   wherein the second diffuser receives first diffused data from the first diffuser and provides second diffused data to the cipher, and
   wherein the cipher encrypts the second diffused data into ciphertext.

2. The system of claim 1, wherein the cipher comprises an Advanced Encryption Standard (AES) cipher.

3. The system of claim 1, wherein the encryption direction is opposite the decryption direction.

4. The system of claim 1, wherein the first diffuser provides the second type of diffusion in the decryption direction.

5. The system of claim 4, wherein the second diffuser provides the first type of diffusion in the encryption direction.

6. The system of claim 1, wherein at least one of the diffusers is provided as an independent layer on top of the cipher.

7. The system of claim 1, wherein, in the first type of diffusion, a relatively small change to an input to the first diffuser in the encryption direction produces a relatively large change to an output from the first diffuser in the encryption direction.

8. The system of claim 7, wherein, in the second type of diffusion, a relatively large change to an input to the second diffuser in the encryption direction produces a relatively small change to an output from the second diffuser in the encryption direction.

9. A computer-implemented cipher method for encrypting plaintext into ciphertext in an encryption direction, the computer comprising a processor, the computer-implemented cipher method comprising:
   providing input data to a first diffuser on the processor, wherein the first diffuser provides a first type of diffusion in a decryption direction and a second type of diffusion in the encryption direction, the decryption direction being opposite the encryption direction, wherein the input data is based on plaintext xorred with a sector key, the sector key is derived from a key that comprises a number of bits, the sector key employs a first portion of the number of bits, and the cipher employs a second portion of the number of bits;
   providing first diffused data from the first diffuser to a second diffuser that provides the first type of diffusion in the encryption direction and the second type of diffusion in the decryption direction; and
   encrypting an output of the second diffuser using a cipher, wherein, in the first type of diffusion, a change to an input to the diffuser produces a change to an output from the diffuser that is larger than the change to the input to the diffuser, and, in the second type of diffusion, a change to an input to the diffuser produces a change to an output from the diffuser that is smaller than the change to the input to the diffuser.

10. The method of claim 9, wherein providing good diffusion comprises producing a relatively large change to an output from a diffuser based on a relatively small change to an input to the diffuser.

11. The method of claim 9, wherein providing not-good diffusion comprises producing a relatively small change to an output from a diffuser based on a relatively large change to an input to the diffuser.

12. The method of claim 10, wherein the cipher encrypts the output of the second diffuser into ciphertext.

13. The method of claim 10, wherein the cipher encrypts the output of the second diffuser into ciphertext when the cipher system operates in the encryption direction.

14. The method of claim 9, wherein the cipher comprises an Advanced Encryption Standard (AES) cipher.

15. The method of claim 9, wherein the sector key and the cipher are independently keyed.

16. The method of claim 9, further comprising deriving the sector key from a key.

17. A cipher system for encrypting plaintext into ciphertext in an encryption direction and for decrypting ciphertext into plaintext in a decryption direction, the cipher system comprising:

a cipher;

a processor;

a first diffuser executing on the processor, wherein the first diffuser provides a first type of diffusion in the decryption direction and a second type of diffusion in the encryption direction, wherein the first diffuser receives input data that is based on plaintext xorred with a sector key, the sector key is derived from a key that comprises a number of bits, the sector key employs a first portion of the number of bits, and the cipher employs a second portion of the number of bits; and a second diffuser executing on the processor, wherein the second diffuser receives first diffused data from the first diffuser, provides the first type of diffusion in the encryption direction and the second type of diffusion in the decryption direction, and provides second diffused data to the cipher, wherein the cipher encrypts the second diffused data into ciphertext, and wherein, in the first type of diffusion, a change to an input to the diffuser produces a change to an output from the diffuser that is larger than the change to the input to the diffuser, and, in the second type of diffusion, a change to an input to the diffuser produces a change to an output from the diffuser that is smaller than the change to the input to the diffuser.

18. The system of claim 17, wherein the decryption direction is opposite the encryption direction.

19. The system of claim 17, wherein at least one of the diffusers is provided as an independent layer on top of the cipher.

20. The system of claim 19, wherein both of the diffusers are provided as independent layers on top of the cipher.

* * * * *